Sept. 23, 1958  R. C. WHITE  2,853,180
VIBRATING CONVEYOR
Filed Dec. 22, 1954  2 Sheets-Sheet 1
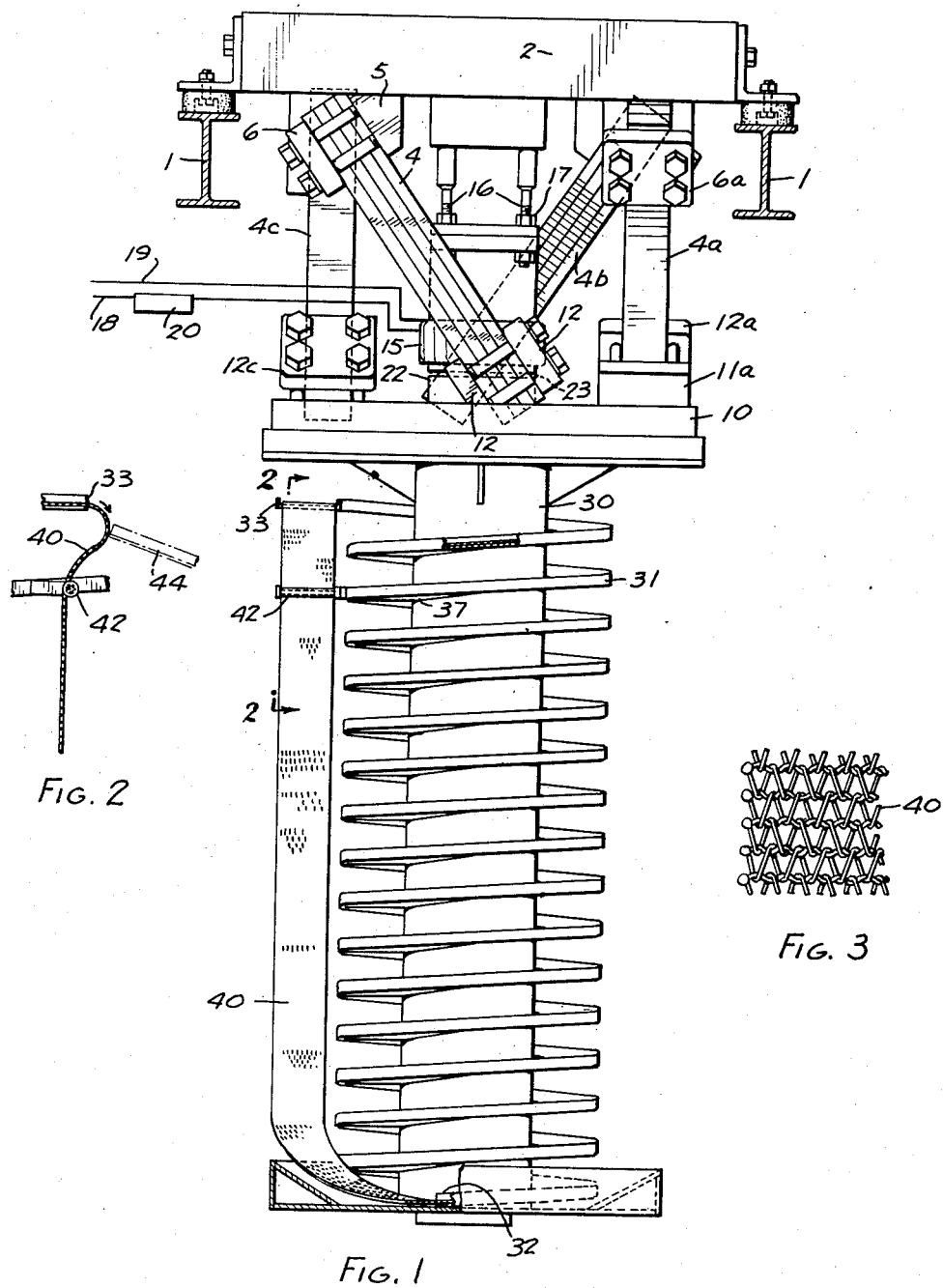
INVENTOR.
ROBERT C. WHITE
BY
Barnes, Kisselle, Laughlin & Raisch
ATTORNEYS.

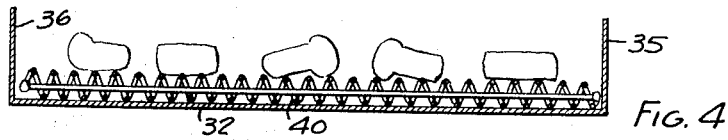
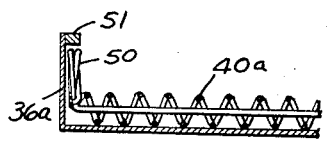
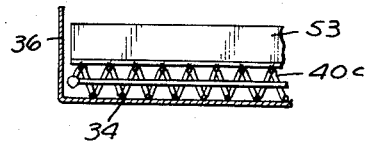
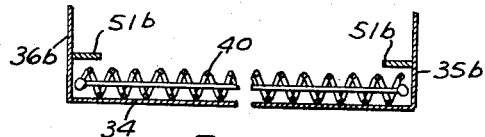
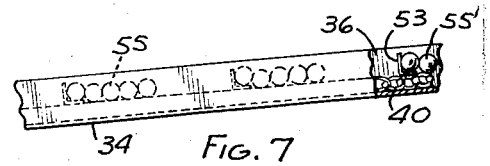
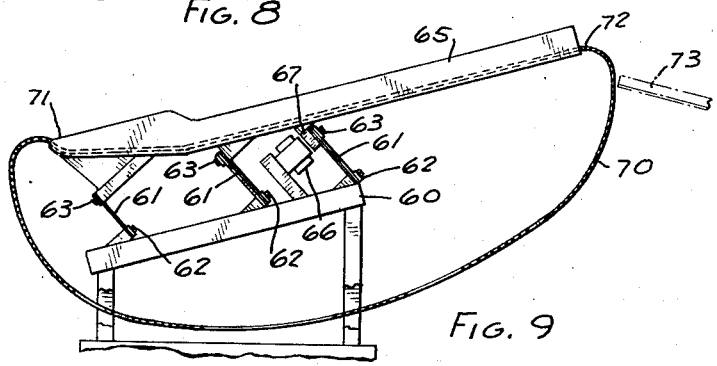
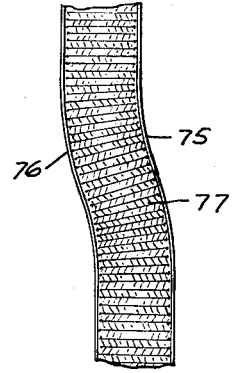
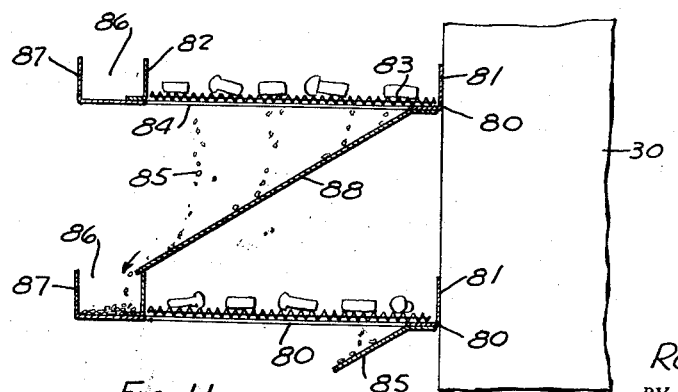

United States Patent Office 2,853,180
Patented Sept. 23, 1958

2,853,180

VIBRATING CONVEYOR

Robert C. White, Detroit, Mich.

Application December 22, 1954, Serial No. 477,014

16 Claims. (Cl. 198—220)

This invention relates to a vibrating conveyor wherein a conveyor trough or channel is reciprocated in such a manner as to cause material or work pieces to travel lengthwise of the trough or channel.

Such a vibrating conveyor is useful for conveying bulk materials and work pieces of different sizes and shapes which may be in the process of manufacture. Heretofore, in conveyors of this type, the materials being conveyed rest directly upon the supporting trough or channel and are caused to travel because of a differential reciprocation or vibration. The trough is vibrated so that in one direction of the reciprocating movement, such movement is relatively quick or sharp while on the return stroke of such reciprocation or vibration the movement is not so quick or sharp. Thus, due to a combination of factors, including the inertia of the materials being conveyed and the frictional engagement of the materials with the trough, the materials are caused to move along the trough.

It is the object of this invention to provide an improved conveyor of the vibratory type which is capable of handling materials and work pieces which could not heretofore be conveyed on the vibratory type of conveyor or which could be conveyed only with difficulty and wherein the materials can be conveyed upwardly at a steeper angle and wherein certain materials, such as machine parts, having relatively delicate or precision formed surfaces are not subject to damage or battered by the conveying action.

The invention is disclosed in the accompanying drawings wherein several modifications of the invention are shown.

Fig. 1 is a general view with some parts cut away and some parts shown in section of a conveyor of the helical type.

Fig. 2 is a view showing some of the parts and taken substantially on line 2—2 of Fig. 1.

Fig. 3 is a partial view of a conveyor element.

Fig. 4 is an enlarged view taken through a conveyor trough and illustrating a conveyor element with materials or work pieces thereon.

Fig. 5 is a partial sectional view similar to Fig. 4 illustrating a modified form.

Fig. 6 is a sectional view similar to Fig. 5 illustrating a further modified form.

Fig. 7 is a partial side elevation with parts cut away illustrating the form shown in Fig. 6.

Fig. 8 is a view similar to Fig. 4 illustrating a further modified form.

Fig. 9 is a general view illustrating the invention as applied to a conveyor for conveying material substantially in a straight line.

Fig. 10 is a view somewhat diagrammatic in nature illustrating that the conveyor of this invention may have a lateral movement.

Fig. 11 is a cross sectional view illustrating an arrangement for the discharge of extraneous material or chips or the like.

The vibrating conveyor structure, as shown in Fig. 1, is of the helical type such as is shown in the H. H. Jones and Robert C. White Patent No. 2,662,851 of December 15, 1953. This conveyor is suspended from suitable supports 1 and it has an upper base member 2. Fixedly secured to this base member are a plurality of leaf springs. One leaf spring 4 has one end thereof clamped to the base 2 by means of a bracket 5 and a bolted clamp 6. In the form shown there are four of such springs indicated at 4a, 4b and 4c. These springs are mounted 90° from each other and they extend angularly downwardly as indicated. There is a top plate 10 and the lower end of the leaf spring 4 is fixedly secured to the top plate 10 near its periphery through the means of a bracket 11 and a clamp 12. The leaf springs 4a, 4b and 4c are similarly attached to the top plate 10 and like parts are indicated by the same reference character with the addition of the letter a.

An electromagnet 15 is carried in suspended manner from the base 2. It is carried by bolts 16 with nuts 17, and electrical conductors for the circuit for the magnet are illustrated at 18 and 19 with a control device, such as a rheostat 20.

An armature 22 is fixedly carried by the top plate 10 with the gap between the armature and the pole piece of electromagnet indicated at 23. The gap may be adjusted by manipulating the nuts 17.

In the operation of the structure thus far described, the magnet is subjected to pulsating electrical current so that it is alternately energized and de-energized. When it is energized, the armature is attracted and the top plate 10 is moved with an upward component and a rotary component on one direction substantially about its axis. The angular relationship of the springs causes the rotary component. When the magnet is de-energized the springs return the top plate with a movement having a downward component and a reverse rotary component. There is a differential in the oscillation or vibratory movement in that the first upward and rotary movement is not so sharp or quick as is the return downward and reverse oscillatory movement. The magnet may be subjected to rectified half-wave alternating current and while the amplitude of the vibration is not great, the vibration may be of the order of 3600 per minute. The amplitude of the vibration may be regulated by a suitable control, such as the rheostat as shown.

Depending from the top plate 10 is a center post 30 having mounted thereon a conveyor trough 31 of helical form. This trough has an entrance end 32 which is its lower end, and an outlet end 33. The trough is of channel form having a bottom portion 34 and sides 35 and 36 (Fig. 4). The helical trough may be secured to the post 30 by welding as at 37.

There is a loose flexible belt or chain belt associated with the conveyor. A portion of such a chain belt is illustrated at 40 in Fig. 3 and the belt shown is comprised of loosely interwoven links with cross extending bars or rods. The actual construction of this belt may vary. It may be of fabric or a fabric-rubber composition. Suffice it to say, that this belt is of endless form and it is positioned to lie in the helical trough as shown in Fig. 4. At the outlet end of the trough, that is, the upper end, as shown in Fig. 1, the belt 40 passes out of the trough, may be guided by a roller 42 and the belt may drop substantially vertically to a point where it enters the inlet end of the trough as at Fig. 2. By referring to this belt as being "loose" the thought intended to be conveyed is that it does not operate over pulleys or rollers and is in no way secured to the trough. It merely lies in the bottom of the trough. At the outlet end 33 of the trough, a suitable receiver or chute 44 may be placed to receive material discharged from the conveyor.

The conveyor may, of course, take other forms than that of the helical form shown. This helical form is advantageous for use in moving manufactured work pieces through an apparatus having a tank containing material which will clean the work pieces of oils and greases. Such work pieces may be any one of a large variety of machine screw products, die castings, cold or hot formed metal pieces or the like. When work pieces are placed directly upon the trough, the differential vibratory movement causes the work pieces to move upwardly along the trough in a flowing manner. However, some work pieces have exposed surfaces which may contact the trough and in the course of traveling the length of the container, such surfaces may become inaccurate or deleteriously affected. Then, too, the area of contact of work pieces is a factor in the movement thereof. For instance, and for example, a simple work piece, such as a nail, has some length and a very small area of contact with the trough at the head and at the point. Sometimes a work piece of this general configuration may not properly progress along the trough due to the lack of area of contact, particularly where the travel is upwardly. Other work pieces, of more symmetrical shape, such as balls, cannot be moved upwardly at all and some work pieces, for example, some types of nuts, which approximate a spherical shape cannot be moved upwardly at least through any considerable angle.

By the use of a loose chain or belt, however, a much larger variety of work pieces may be conveyed. In the operation of the conveyor, as shown in Fig. 1, the belt or chain is actually the moving element. As the trough is differentially reciprocated, or oscillated, the entire body of the belt which rests upon the bottom of the trough is caused to move with a flowing action even though there is no connection between the belt and the trough other than the fact that it merely rests upon the bottom of the trough. As the increments of belt pass from the outlet end 33 of the trough, the run of belt may freely gravitate down to the entrance end 32. Work pieces may be placed on the conveyor at any place as, for example, near the bottom convolution of the belt. The work pieces are actually held out of contact with the trough and lie on the moving belt. The belt has a large area of contact with the trough and actually contacts with it from the entrance end to the outlet end. As a result, the work pieces are carried by the moving belt. Accordingly, work pieces having a precision or delicately formed exterior surface may be placed upon the belt at random, or poured on if the work pieces are small enough, and are not in frictional engagement with the trough. The surfaces thereof are not subject to being marred or in any way deleteriously affected. Work pieces so shaped as to have a minimum contact with the underlying supporting surface actually rest upon the moving belt and are carried along with the belt. The belt has no backward or reverse movement relative to the work pieces but the trough has a backward or reverse movement relative to the belt. Work pieces which are fairly symmetrical are efficiently carried along by the belt even though there is a considerable upward angle.

The belt shown herein, as stated above, is a relatively loosely woven wire construction capable of being flexed on the axis of the conveyor to the end that the lineal extent of the outside edge of the belt is greater than the lineal extent of the inside edge. In this connection, a belt of material which may be of woven fabric or a woven fabric combined with or reinforced by a rubber or other elastic substance, whether of open form or of impervious form, may be employed.

In the form shown in Fig. 5, the chain or belt 40a has an upturned edge 50 which may be preferred for some uses to better retain small work pieces and the side walls of the trough such as the side wall 36a may have an overlying flange 51 to overlie the upturned edge and to keep the flexible belt from bunching up in the trough. In this connection it may be explained that if a belt of the flexible chain is subjected to undue resistance at any point along the length of the trough, that the belt at the point of resistance may cease to progress with the trough, but the portions of the belt rearwardly thereof may continue to advance with the trough which may result in some bunching of the chain. To explain this, it may be said that an operator can actually hold the belt with the hand at a point along the length of the trough. The overlying flange aids in preventing the chain belt from bunching up. As shown in Fig. 8, the belt 40 without the turned up edges may be employed with a trough where the side walls 35b and 36b thereof are provided with an overhanging flange 51b. The edges of the belt, therefore, function in a channel. Furthermore, the overhanging flanges aid in preventing small work pieces from working over the edge of the belt and perhaps working around the edge and under the belt.

As shown in Figs. 6 and 7 the flexible belt or chain 40c is provided with cross bars or cross plates 53. With this arrangement, spherical or near spherical work pieces may be conveyed, as, for example, the balls 55. Furthermore, by using cross pieces the angle of elevation may be increased.

In the form shown in Fig. 9, there is a simple straight line conveyor to demonstrate that the invention may be employed in such a conveyor. This conveyor has a suitable frame 60 supporting elastic elements or springs 61. Each spring is securely fastened to the frame as at 62 and securely fastened to the trough as at 63. The trough is indicated at 65. An electromagnet 66 mounted on the frame is associated with an armature 67 secured to the trough. The flexible belt or chain is indicated at 70. It enters the trough as at 71 and passes from the outlet end of the trough as at 72, while the material may be delivered to any suitable means as indicated at 73. The belt 70 may loop freely from the outlet end to the inlet end of this conveyor.

In the operation of this conveyor, the magnet attracts the armature, shifts the trough sharply downwardly and to the left or backwardly as Fig. 9 is viewed. This sharp movement shifts the trough without shifting the belt in the same manner as does the corresponding movement of the helical type shown in Fig. 1. When the magnet is de-energized the springs shift the trough with an upward component and a forward component but this movement is not so sharp and the belt moves with the trough. The materials to be conveyed may be placed on the belt near the entrance end 71 and the same is conveyed with the belt and is discharged at the outlet end 72.

Where a laterally flexible chain or belt is used, the conveyor is three-dimensional, so to speak, as indicated in Fig. 10. Here a trough is shown with side walls 75 and 76 with a flexible chain or belt 76 wherein the conveyor may shift laterally in the plane of the belt or chain as indicated which, however, is really a variety of the helical conveyor in the sense that the chain or belt of the helical conveyor has a lateral shift in its helical form.

The conveyor is admirably adapted to free work pieces from chips and other extraneous solid material, as indicated in Fig. 11. In Fig. 11, the trough 80 has side flanges 81 and 82 with the conveyor belt 83 therein. At points along the length of the trough, the bottom of the trough may be provided with an opening 84 of such dimensions that the belt will effectively bridge the opening and chips and other extraneous material may drop through the foraminous belt and opening as indicated at 85. Where such an arrangement is embodied in a conveyor of the helical type, wherein one convolution of the trough is above another, the trough may be provided with an additional channel 86 defined by a side wall 87 and an inclined plate 88 may catch and direct the falling chips of material into the channel of the next lower convolution. With this arrangement, the channel 86 does not become filled with the chips or material as the chips or material are likewise conveyed or discharged from the end of the trough but, of course, separate from the work pieces.

In disclosing the invention, it has been set forth how work pieces undergoing manufacture or perhaps already manufactured, may be conveyed and cleaned of oil, greases, chips, etc., but it is to be understood that the invention may be employed for conveying any kind of material. Bulk material can be conveyed other than manufactured products, and one advantage is that the material may be conveyed upwardly through a steeper angle. The cross bars, such as the bars 53 may be employed for bulk material, to further increase the efficiency and upward angle. The employment of the belt or chain also makes for a more silent operation in that the belt or chain moves relative to the trough more silently than does work pieces which may, at times, have a bouncing action on the trough. Materials may be conveyed downwardly as well as upwardly, as for example, from the top of helical conveyor to the bottom thereof. In the claims appended hereto the word "reciprocation" is used to describe the movement given to the trough and this term as used is applicable to the form shown in Fig. 1 wherein the reciprocation is substantially about an axis and, therefore, of the oscillating type.

I claim:

1. A conveyor comprising in combination, a support, means for differentially reciprocating the support, a belt resting unconnectedly upon the support, whereby the belt moves along the support incident to the differential reciprocation of the support, said belt adapted to have material to be conveyed placed thereon and carried thereby.

2. A conveyor comprising in combination, a support, means for differentially reciprocating the support, a loose belt resting unrestrained upon the support and thereby in frictional engagement with the support, whereby the belt moves along the support incident to the differential reciprocation of the support, said belt adapted to have material to be conveyed placed thereon and carried thereby.

3. A conveyor comprising in combination, a support, means for differentially reciprocating the support, a loosely woven flexible chain-like belt of metal resting upon the support and in frictional engagement therewith and otherwise not secured to the support, whereby the belt moves along the conveyor incident to the differential reciprocation of the support, said belt being unrestrained and adapted to have material to be conveyed placed thereon and carried thereby.

4. A conveyor comprising in combination, a support, means for differentially reciprocating the support, an endless belt having portions thereon resting upon the support in frictional engagement thereof and having other portions extending unrestrained from one end of the support to the other end free of the support, whereby the belt moves circuitously with the portions on the support moving along the support incident to the differential reciprocation of the support, the portions of the belt on the support adapted to have material to be conveyed placed thereon and carried thereby.

5. A conveyor comprising in combination, a support having an entrance end and an outlet end, means for differentially reciprocating the support, an endless belt having portions thereof resting upon the support and other portions extending unrestrained from the outlet end of the support to the inlet end of the support and free of the support, whereby the belt moves circuitously with the portions on the support moving along the support and other portions returning from the outlet end of the support to the inlet end of the support incident to the differential reciprocation of the support, the portions of the belt resting upon the support adapted to have material to be conveyed placed thereon and carried thereby.

6. A conveyor comprising in combination, a support in the form of a trough having a bottom wall and side walls, means for differentially reciprocating the support, a loosely woven metallic chain-like free belt disposed in the trough and resting on the bottom thereof with the edges of the belt in close proximity to the sides of the trough, whereby the belt moves along the support incident to the differential reciprocation of the support, said belt adapted to have material to be conveyed placed thereon and carried thereby.

7. A conveyor comprising in combination, a support in the form of a trough having a bottom wall and side walls, means for differentially reciprocating the support, a loosely woven metallic chain-like belt disposed in the trough and resting on the bottom thereof with the edges of the belt in close proximity to the sides of the trough, whereby the belt moves along the support incident to the differential reciprocation of the support, a flange on the sides of the trough overlying the edges of the belt, said belt adapted to have material to be conveyed placed thereon and carried thereby.

8. A conveyor comprising in combination, a support in the form of a trough having a bottom wall and side walls, means for differentially reciprocating the support, a loosely woven metallic chain-like belt disposed in the trough and resting on the bottom thereof with the edges of the belt in close proximity to the sides of the trough, said edges of the belt being upturned to extend along the sides of the trough, whereby the belt moves along the support incident to the differential reciprocation of the support, the sides of the trough each having a flange thereon overlying the upturned edges of the belt, said belt adapted to have material to be conveyed placed thereon and carried thereby.

9. A conveyor comprising in combination, a support in the form of a trough having a bottom wall and side walls, means for differentially reciprocating the support, a loosely woven metallic chain-like belt disposed in the trough and resting on the bottom thereof with the edges of the belt in close proximity to the sides of the trough, whereby the belt moves along the support incident to the differential reciprocation of the support, a plurality of spaced bars extending transversely across the belt and extending upwardly therefrom, said belt adapted to have material to be conveyed placed thereon and carried thereby with said spaced bars engaging the material to cause the same to move with the belt.

10. A conveyor comprising in combination, a support in the form of a trough having a bottom and side walls, means for differentially reciprocating the support, a loose belt having portions positioned in the trough and resting upon the bottom thereof, whereby the belt moves along the support incident to the differential reciprocation of the support, and a plurality of spaced bars secured to the belt and extending transversely thereof, said belt adapted to have material to be conveyed placed thereon and carried thereby and said bars engaging the material to facilitate movement of the material with the belt.

11. A conveyor comprising in combination, a support, means for differentially reciprocating the support, a free belt of flexible foraminous material having portions resting upon the support, whereby the belt moves along the support incident to the differential reciprocation of the support, said belt adapted to have material to be conveyed placed thereon and carried thereby, said support having one or more openings therein of dimensions to be bridged by the belt for the passage of chips and extraneous material through the belt and said openings to separate the same from the conveyed material.

12. A conveyor comprising in combination, a support having portions thereof positioned one above another, means for differentially reciprocating the support, a free belt of flexible foraminous material having portions resting upon the support, whereby the belt moves along the support incident to the differential reciprocation of the support, said belt adapted to have material to be conveyed placed thereon and carried thereby, said support having one or more openings therein of dimensions to be bridged by the belt for the passage of chips and other extraneous material through the foraminous belt and openings, said support having a channel along one side thereof, and means for directing laterally the chips and extraneous material falling through an opening in the support into the channel of the portion of the support below.

13. A conveyor comprising in combination, a support of helical form having one convolution above another, means differentially oscillating the support, a flexible endless belt having a portion thereof resting upon the helical support throughout the length of the support and a free portion extending from the upper end of the helical support to the lower end thereof, said belt being only in frictional engagement with the helical support as it rests thereon, whereby the belt moves circuitously and along the helical support incident to the differential oscillation of the support, said belt adapted to have material to be conveyed placed thereon and carried thereby.

14. The conveyor as recited in claim 13 characterized in that the support is in the form of a trough, with a bottom and side walls.

15. The conveyor as recited in claim 13 characterized in that the belt is a loosely woven metallic chain-like structure.

16. A conveyor comprising in combination, a support, means for differentially reciprocating the support, and a free, relatively flat, flexible, reticulate belt resting upon the support, whereby the belt moves along the conveyor incident to the differential reciprocation of the support, said belt adapted to have material to be conveyed placed thereon and carried thereby.

References Cited in the file of this patent

UNITED STATES PATENTS

| 429,147 | Mosher | June 3, 1890 |
| 1,756,598 | King | Apr. 29, 1930 |
| 2,353,067 | Patterson | July 4, 1944 |